US009762396B2

(12) United States Patent
Susan et al.

(10) Patent No.: US 9,762,396 B2
(45) Date of Patent: *Sep. 12, 2017

(54) DEVICE THEFT PROTECTION ASSOCIATING A DEVICE IDENTIFIER AND A USER IDENTIFIER

(71) Applicant: Microsoft Technology Licensing, LLC, Redmond, WA (US)

(72) Inventors: Mihai Irinel Susan, Redmond, WA (US); Bogdan Andreiu, Redmond, WA (US); Scott R. Shell, Kirkland, WA (US); Scott Michael Bragg, Snoqualmie, WA (US); Ling Tony Chen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/368,069

(22) Filed: Dec. 2, 2016

(65) Prior Publication Data
US 2017/0085386 A1 Mar. 23, 2017

Related U.S. Application Data

(63) Continuation of application No. 14/733,359, filed on Jun. 8, 2015, now Pat. No. 9,565,169.
(Continued)

(51) Int. Cl.
*H04L 29/06* (2006.01)
*H04L 9/32* (2006.01)
(Continued)

(52) U.S. Cl.
CPC .......... *H04L 9/3242* (2013.01); *G06F 9/4405* (2013.01); *H04L 9/0861* (2013.01);
(Continued)

(58) Field of Classification Search
CPC ........ H04L 9/3242; H04L 9/30; H04L 9/0861
See application file for complete search history.

(56) References Cited

U.S. PATENT DOCUMENTS 6,151,678 A 11/2000 Davis
6,477,511 B1 11/2002 Guenther
(Continued)

FOREIGN PATENT DOCUMENTS

WO WO-2014063330 5/2014

OTHER PUBLICATIONS

"International Preliminary Report on Patentability", Application No. PCT/US2016/020316, Feb. 14, 2017, 8 pages.
"Anti-Theft—Total Protection", Retrieved From: <https://play.google.com/store/apps/details?id=com.amalgame.totalprotection> Mar. 27, 2015, May 5, 2014, 3 pages.
"Avast Free Mobile Security", Retrieved From: <https://www.avast.com/en-in/free-mobile-security> Mar. 20, 2015, 11 pages.
"Bitdefender Anti-Theft", Retrieved From: <http://www.bitdefender.com/solutions/anti-theft.html> Mar. 20, 2015, Jan. 2013, 3 pages.
(Continued)

*Primary Examiner* — Ali Shayanfar

(57) ABSTRACT

When theft protection of a computing device is initiated, credentials of the user are provided to one or more services that verify the credentials and generate a recovery key. A data value is generated based on the recovery key and an identifier of the computing device (e.g., by applying a cryptographic hash function to the recovery key and the computing device identifier), and the data value is provided to the computing device, which stores the data value at the computing device. When a user is prompted to prove his or her ownership of the device, the owner can prove his or her ownership of the device in different manners by accessing the one or more services via a network (e.g., the Internet), or by providing the recovery key (e.g., obtained using another computing device) to the computing device.

20 Claims, 7 Drawing Sheets

Related U.S. Application Data

(60) Provisional application No. 62/140,310, filed on Mar. 30, 2015.

(51) Int. Cl.

| | | |
|---|---|---|
| *H04W 12/04* | (2009.01) | |
| *H04W 12/06* | (2009.01) | |
| *G06F 9/44* | (2006.01) | |
| *H04L 9/08* | (2006.01) | |
| *H04L 9/14* | (2006.01) | |
| *H04L 9/30* | (2006.01) | |
| *H04W 12/12* | (2009.01) | |

(52) U.S. Cl.
CPC .................. *H04L 9/14* (2013.01); *H04L 9/30* (2013.01); *H04L 63/0435* (2013.01); *H04L 63/062* (2013.01); *H04W 12/04* (2013.01); *H04W 12/06* (2013.01); *H04W 12/12* (2013.01)

(56) References Cited

U.S. PATENT DOCUMENTS

| | | | | |
|---|---|---|---|---|
| 6,662,023 | B1 | 12/2003 | Helle | |
| 7,389,123 | B2 | 6/2008 | Rydgren et al. | |
| 7,590,837 | B2 | 9/2009 | Bhansali et al. | |
| 8,467,768 | B2 | 6/2013 | Mahaffey et al. | |
| 8,483,659 | B2 | 7/2013 | Mahajan | |
| 8,762,704 | B2* | 6/2014 | Rothkopf | G06F 1/1626 206/320 |
| 9,049,010 | B2* | 6/2015 | Jueneman | G06F 21/32 |
| 9,489,528 | B2* | 11/2016 | Goel | H04L 9/0891 |
| 9,565,169 | B2 | 2/2017 | Susan et al. | |
| 2003/0158960 | A1 | 8/2003 | Engberg | |
| 2007/0021112 | A1* | 1/2007 | Byrne | H04W 8/30 455/419 |
| 2007/0106892 | A1* | 5/2007 | Engberg | G06Q 20/02 713/168 |
| 2008/0184351 | A1* | 7/2008 | Gephart | G06F 21/33 726/7 |
| 2010/0088525 | A1* | 4/2010 | Ureche | G06F 21/80 713/193 |
| 2011/0087896 | A1* | 4/2011 | Thom | G06F 21/34 713/193 |
| 2011/0154023 | A1* | 6/2011 | Smith | G06F 21/78 713/155 |
| 2011/0302660 | A1 | 12/2011 | Mahalingaiah | |
| 2012/0017271 | A1 | 1/2012 | Smith et al. | |
| 2013/0086373 | A1 | 4/2013 | Rothkopf et al. | |
| 2013/0160139 | A1* | 6/2013 | Goel | G06F 21/57 726/27 |
| 2013/0326642 | A1 | 12/2013 | Hajj et al. | |
| 2014/0329500 | A1 | 11/2014 | Wang et al. | |
| 2014/0364099 | A1* | 12/2014 | Pai | H04L 63/08 455/418 |
| 2014/0373184 | A1* | 12/2014 | Mahaffey | H04W 12/12 726/35 |
| 2015/0270956 | A1* | 9/2015 | Basmov | G06F 21/602 713/189 |
| 2016/0294790 | A1 | 10/2016 | Susan et al. | |

OTHER PUBLICATIONS

"GSMAMobile Phone Theft", Retrieved From: <http://www.gsma.com/technicalprojects/fraud-security/security-advice-for-mobile-phone-users/mobile-phone-theft> Mar. 27, 2015, 2 pages.

"How Can I Protect My Phone?", Retrieved From: <https://motorola-global-portal.custhelp.com/app/answers/detail/a_id/95507> Mar. 27, 2015, 2013, 3 pages.

"iCloud: Activation Lock", Retrieved From: <https://support.apple.com/kb/PH13695?locale=en_US> Mar. 27, 2015, Feb. 4, 2015, 1 page.

"International Search Report and Written Opinion", Application No. PCT/US2016/020316, May 18, 2016, 14 pages.

"Make Sure your Device is Protected", Retrieved From: <https://support.google.com/nexus/answer/6172890?hl=en> Mar. 27, 2015, 3 pages.

"Notice of Allowance", U.S. Appl. No. 14/733,359, Sep. 23, 2016, 18 pages.

"Protects Laptops and Data with Intel Anti-theft Technology", Available at: <http://www.intel.in/content/dam/doc/product-brief/mobile-computing-protect-laptops-and-data-with-intel-anti-theft-technology-brief.pdf>, Feb. 2011, 2 pages.

"Remotely Ring, Lock, or Erase a Lost Device", Retrieved From: <https://support.google.com/nexus/answer/6160500> Mar. 27, 2015, 3 pages.

"Smartphone Anti-Theft Voluntary Commitment", Available at: <http://www.ctia.org/docs/default-source/default-document-library/smartphone-anti-theft-voluntary-commitment.pdf?sfvrsn=4>, Apr. 15, 2014, 1 page.

"Unified Extensible Firmware Interface Specification", Version 2.4 Errata B, Apr. 2014, 2302 pages.

"What is Reactivation Lock and how do I use it?", Retrieved From: <http://www.samsung.com/us/support/howtoguide/N0000002/17296/229710/SCH-N330PWLXAR> Mar. 27, 2015, Jan. 22, 2015, 5 pages.

Colp,"Protecting Data on Smartphones and Tablets from Memory Attacks", ACM, 2015, pp. 177-189.

Kastrenakes,"Android Lollipop has a 'Kill Switch' that can Make Stolen Phones Useless", Retrieved From: <http://www.theverge.com/2014/10/15/6983509/android-lollipop-includes-kill-switch-factory-reset-protection> Mar. 27, 2015, Oct. 15, 2014, 2 pages.

Malenkovich,"Beware of Vulnerable Anti-Theft Applications", Retrieved From:.<http://blog.kaspersky.co.in/beware-of-vulnerable-anti-theft-applications/>, Feb. 20, 2014, 4 pages.

Mylonas,"Smartphone Security Evaluation", The Malware Attack Case, IEEE, 2011, 12 pages.

Nystrom,"UEFI Networking and Pre-OS Security", Intel Technology Journal, vol. 15, Issue 1, Available at <http://www.intel.com/technology/itj/2011/v15i1/pdfs/UEFI-Networking-and-Pre-OS-Security.pdf>, Nov. 2011, pp. 80-101.

Smith,"Storage Protection with Intel Anti-Theft Technology—Data Protection (Intel AT-d)", In Intel Technology Journal, vol. 12, Issue 4, Dec. 23, 2008, pp. 239-254.

Warren,"Microsoft Developing Activation Lock to Render Stolen Windows Phones Useless", Retrieved From: <http://www.theverge.com/2014/6/19/5824246/windows-phone-activation-lock-features> Mar. 27, 2015, Jun. 19, 2014, 2 pages.

\* cited by examiner

DEVICE THEFT PROTECTION ASSOCIATING A DEVICE IDENTIFIER AND A USER IDENTIFIER

RELATED APPLICATIONS

This application is a continuation of U.S. patent application Ser. No. 14/733,359, filed Jun. 8, 2015, entitled "Device Theft Protection Associating A Device Identifier And A User Identifier", the entire disclosure of which is hereby incorporated by reference herein in its entirety. U.S. patent application Ser. No. 14/733,359 claims priority to U.S. Provisional Application No. 62/140,310, filed Mar. 30, 2015, entitled "Device Theft Protection Associating A Device Identifier And A User Identifier", the entire disclosure of which is hereby incorporated by reference herein in its entirety.

BACKGROUND

As technology has advanced, computing devices have become increasingly commonplace in our daily lives. Many of these computing devices are portable, such as smartphones, tablet computers, and so forth. Although this portability provides many benefits, it also makes these devices the targets of thieves. Many computing devices provide little or no protection against theft, allowing thieves to easily sell or use these stolen devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a determination is made that theft protection is to be enabled on a computing device. User credentials of a user of the computing device are sent to an identity service over a network, and a ticket indicating that the user credentials have been verified by the identity service is received from the identity service. The ticket is sent to a key service over the network, and a value having been generated by the key service based on a recovery key for the computing device as well as a device identifier that identifies the computing device is received from the key service and saved as an authenticated variable on the computing device.

In accordance with one or more aspects, a determination is made that ownership of a computing device is to be verified. In response to access to a key service over a network being available, an indication is obtained from the key service whether the user is the owner of the computing device, the indication being based on user credentials input to the computing device. In response to access to the key service over the network not being available, a recovery key received as user input is used to determine whether the user is the owner of the computing device. The user is allowed to access the computing device in response to the user being determined to be the owner of the computing device, and the user is denied access to the computing device in response to the user being determined to not be the owner of the computing device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
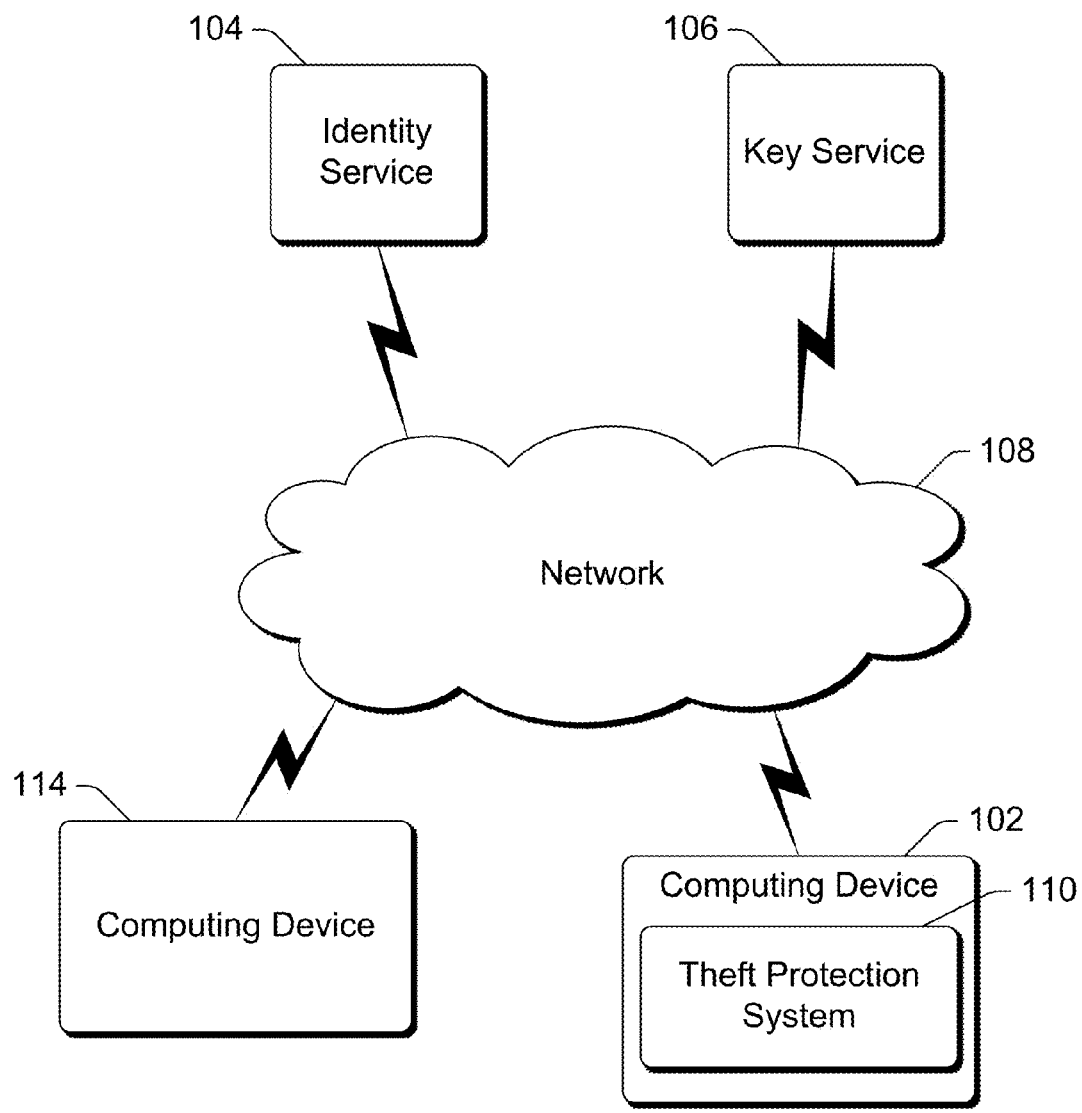
FIG. 1 illustrates an example system implementing the device theft protection associating a device identifier and a user identifier in accordance with one or more embodiments.

Device theft protection associating a device identifier and a user identifier is discussed herein. A user can have his or her computing device protected. A protected computing device or a computing device being in a protected state refers to a computing device that is associated with an account of the user. An unprotected computing device or a computing device being in an unprotected state refers to a computing device that is not associated with an account of the user. At the time when protection of the computing device is initiated, credentials of the user are provided to one or more services that verify the credentials and generate a recovery key. A data value is generated based on the recovery key and an identifier of the computing device (e.g., by applying a cryptographic hash function to the recovery key and the computing device identifier), and the data value is provided to the computing device. The computing device stores the data value as an authenticated variable, allowing the data value to be read at the computing device but not overwritten unless authorized by the one or more services.

At various times (e.g., when the user desires to make his or her computing device an unprotected computing device, when a new version of an operating system is installed on a computing device, when a user's device is reported stolen or lost) the user is prompted to prove his or her ownership of the device. The owner of the computing device is the user whose account is associated with the computing device. The owner of the computing device can prove his or her ownership of the device in different manners. If the computing device is connected to one or more services via a network (e.g., the Internet), then the user provide his or her credentials to the computing device, which communicates with the one or more services to verify the user's credentials and thus that the user is the owner of the device. If the computing device is not connected to the one or more services via a network, then the user uses the recovery key for the device. The recovery key can be obtained by the user, for example, using a different computing device. Using the identifier of the computing device and the recovery key, the data value is generated at the computing device, and the user's ownership of the computing device proven if the data value generated based on the recovery key provided by the user is the same as the data value previously received from the one or more services. If the user proves his or her ownership of the computing device, then access to the device is permitted. However, if the user does not prove his or her ownership of the computing device, then access to the device is not permitted (access to the device is denied).

The techniques discussed herein thus improve the security of the computing device by linking or associating the computing device with a particular user. If the user's device is stolen, the thief will not know the recovery key or the credentials of the user, and thus will not be able to access and use the device. Usability of the device is improved, however, by allowing the owner of the device, who is able to prove his or her ownership of the device, to access and use the device regardless of whether the device is coupled to the one or more services that verify the user's credentials. Furthermore, the data value that is stored on the computing device is stored as an authenticated variable, which refers to a variable that cannot be written without approval by the one or more services that verify the user's credentials, and thus any attempts by the thief to overwrite the data value would be thwarted.

The techniques discussed herein further improve the security and usability of the computing device by leveraging the benefits of both remote services managing the protected state of the computing device and the computing device itself managing the protected state of the computing device. Trusted mobile operators or manufacturers are able to disable the protected state of the computing device in situations where the computing device has been returned by a user (e.g., in exchange for another device or for a refund). Furthermore, the owner of the computing device is still able to prove ownership of the computing device even in situations in which the computing device does not have access to the remote services that verify the user's credentials.

References are made herein to cryptography, which can include symmetric key cryptography and symmetric keys, and/or public key cryptography and public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key. Additionally, digital signatures can be generated based on symmetric key cryptography, such as using a keyed-hash message authentication code mechanism. Any entity with the shared key can generate and verify the digital signature. For example, a trusted third party can generate a symmetric key based on an identity of a particular entity, and then can both generate and verify digital signatures for that particular entity (e.g., by encrypting or decrypting the data using the symmetric key).

FIG. 1 illustrates an example system 100 implementing the device theft protection associating a device identifier and a user identifier in accordance with one or more embodiments. System 100 includes a computing device 102 that can communicate with an identity service 104 and a key service 106 via a network 108. The network 108 can be a variety of different networks, including the Internet, a local area network (LAN), a cellular or other phone network, an intranet, other public and/or proprietary networks, combinations thereof, and so forth.

The computing device 102 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet), an entertainment device (e.g., an entertainment appliance, a set-top box communicatively coupled to a display device, a game console), a television or other display device, an automotive computer, and so forth. Thus, the computing device 102 may range from a full resource device with substantial memory and processor resources (e.g., personal computers, game consoles) to a low-resource device with limited memory and/or processing resources (e.g., traditional set-top boxes, hand-held game consoles).

The services 104 and 106 can each be implemented as one or more of a variety of different types of devices. Similar to the discussion of the computing device 102, these devices implementing the services 104 and 106 can be a variety of different types of devices, ranging from full resource devices with substantial memory and processor resources to low-resource devices with limited memory and/or processing resources. Although illustrated as two separate services, alternatively the services 104 and 106 are implemented as a single service.

The identity service 104 maintains and verifies user credentials for a user of the computing device 102. These user credentials can take various forms, such as user id and password combinations, digital certificates or other digitally signed data structures obtained from a smartcard or other device, personal identification numbers provided to the user by the identity service 104, and so forth. The identity service 104 receives user credentials from the computing device 102, attempts to verify the user credentials (e.g., verify the received user credentials are the same user credentials as were previously provided to the identity service 104), and returns an indication to the computing device 102 whether the user credentials are verified.

The key service 106 generates and maintains recovery keys associated with computing device identifiers. The computing device 102 provides the indication of verified user credentials that it receives from the identity service 104 to the key service 106, along with an identifier of the computing device 102. The key service 106 generates a recovery key for the computing device 102 and maintains a record of the recovery key as associated with the device identifier of the computing device 102 and an identifier of the user (e.g., as identified in the indication received from the identity service 104 as to whether the user credentials are verified). The key service 106 generates a data value based on the recovery key and the device identifier, such as by applying a cryptographic hash algorithm to a combination (e.g., a concatenation) of the recovery key and the device identifier. This data value is returned to the computing device 102. The key service 106 also maintains a record of whether the computing device 102 is in a protected state or an unprotected state.

The computing device 102 includes a theft protection system 110. The theft protection system 110 communicates with the identity service 104 and the key service 106. The theft protection system 110 provides user credentials to the identity service 104 and receives from the identity service 104 an indication of whether the user credentials are verified. The theft protection system 110 also provides the indication of whether the user credentials are verified to the key service 106, along with an indication of a device identifier of the computing device 102. In response, the theft protection system 110 receives a data value having been generated by the key service 106 based on a recovery key for the computing device 102 as well as a device identifier that identifies the computing device 102. The theft protection system 110 also gates or controls access to the functionality of the computing device 102, allowing a user to access and use the computing device 102, or denying access and use of the computing device 102 to the user. If the computing device 102 is in the protected state, whether access to the functionality of the computing device 102 is allowed is based on whether the user is proven to be an owner of the computing device 102, as discussed in more detail below. If the computing device 102 is in the unprotected state, access to the functionality of the computing device 102 is allowed regardless of whether the user is proved to be the owner of the computing device 102.

The system 100 also includes a computing device 114. The computing device 114 can be any of a variety of types of computing devices, analogous to the discussion above regarding computing device 102. A user of the computing device 114 can also access the identity service 104 and the key service 106, and receive the recovery key associated with a particular computing device. By way of example, a user of the computing device 102 can also be a user of the computing device 114, and provide his or her user credentials to the identity service 104. An indication that the user credentials are verified are returned to the computing device 114, which can provide the user credentials to the key service 106. The key service 106 makes available to the user of the computing device 114 the recovery key of the computing device 102 (which the key service 106 maintains as associated with an identifier of the user as discussed above). The user of the computing device can then use this recovery key to prove he or she is the owner of the computing device 102, as discussed in more detail below.

It should be noted that the computing device 114 and the computing device 102 are separate devices that need not communicate with one another in order for the user to use the computing device 114 to obtain the recovery key for the computing device 102. The computing device 102 need not be connected to the computing device 114 via a wired connection or a wireless connection (e.g., the computing device 102 need not be tethered to the computing device 114). Rather, the user enters the recovery key for the computing device 102, obtained via the computing device 114, to the computing device 102. For example, the user can input the recovery key via a touchscreen, keypad, audible inputs, and so forth.

Figure 2:
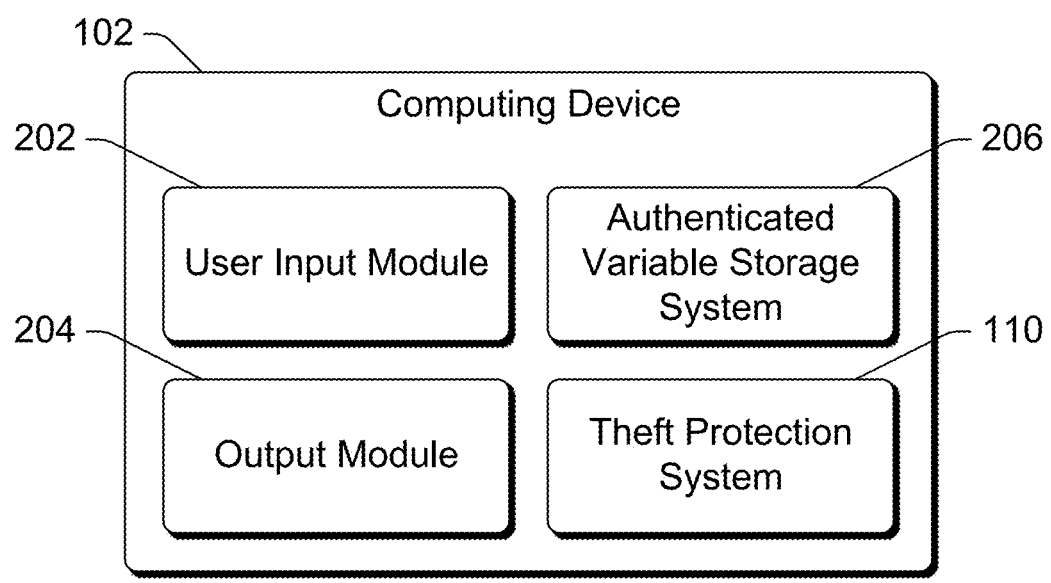
FIG. 2 illustrates an example computing device in accordance with one or more embodiments.

FIG. 2 illustrates an example computing device 102 in accordance with one or more embodiments. The computing device 102 includes the theft protection system 110, a user input module 202, an output module 204, and an authenticated variable storage system 206. Although particular functionality is discussed herein with reference to modules 202 and 204 as well as systems 110 and 206, it should be noted that the functionality of individual ones of modules 202 and 204, as well as systems 110 and 206 can be separated into multiple modules or systems, and/or at least some functionality of multiple modules or systems can be combined into a single module or system.

The theft protection system 110, as discussed above, communicates with the identity service 104 and the key service 106, and gates or controls access to the functionality of the computing device 102. The theft protection system 110 can gate or control access to the functionality of the computing device 102 in any of a variety of different manners. In one or more embodiments, the theft protection system 110 operates early during the process of booting the computing device 102, such as during a pre-boot sequence, and terminates the booting of the computing device 102 if the user of the computing device 102 is not proven to be the owner of the computing device. Additionally or alternatively, the theft protection system 110 can operate after booting of the computing device 102, such as in response to a request from the key service 106 or other remote service. In such situations, the theft protection system 110 causes the operating system of the computing device 102 to cease executing other programs (e.g., other than those used by the theft protection system 110) until the user of the computing device 102 is proven to be the owner of the computing device 102.

The user input module 202 receives user inputs from a user of the computing device 102. User inputs can be provided in a variety of different manners, such as by pressing one or more keys of a keypad or keyboard of the device 102, pressing one or more keys of a controller (e.g., remote control device, mouse, track pad, etc.) of the device 102, pressing a particular portion of a touchpad or touchscreen of the device 102, making a particular gesture on a touchpad or touchscreen of the device 102, and/or making a particular gesture on a controller (e.g., remote control device, mouse, track pad, etc.) of the device 102. User inputs can also be provided via other physical feedback input to the device 102, such as tapping any portion of the device 102, an action that can be recognized by a motion detection or other component of the device 102 (such as shaking the device 102, rotating the device 102, bending or flexing the device 102, etc.), and so forth. User inputs can also be provided in other manners, such as via voice or other audible inputs to a microphone, via motions of hands or other body parts observed by an image capture device, and so forth.

The output module 204 generates, manages, and/or outputs content for display, playback, and/or other presentation. This content can be created by the output module 204 or obtained from other modules of the computing device 102. This content can be, for example, a display or playback portion of a user interface (UI), a prompt for an input of user credentials or a recovery key, and so forth. The content can be displayed or otherwise played back by components of the computing device 102 (e.g., speakers, interactive display devices, etc.). Alternatively, the output module 204 can generate one or more signals that are output to other devices or components (e.g., speakers, display devices, etc.) that are separate from the computing device 102.

The authenticated variable storage system 206 operates to store various different variables or data values discussed herein. In one or more embodiments, the authenticated variable storage system 206 allows various different programs or modules to read variables or data stored by the authenticated variable storage system 206, but allows such variable or data to be written to the authenticated variable storage system 206 only if such writing is an authenticated action. The writing of a variable or data can be determined to be authenticated in different manners, such as by the variable or data being digitally signed by one or more trusted entities. These one or more trusted entities can be, for example, one or a combination of the theft protection system 110, the identity service 104, and the key service 106. In one or more embodiments, the authenticated variable storage system 206 is a system that complies with and implements the Unified Extensible Firmware Interface (UEFI) Specification, Version 2.4 Errata B, April 2014.

Figure 3A:
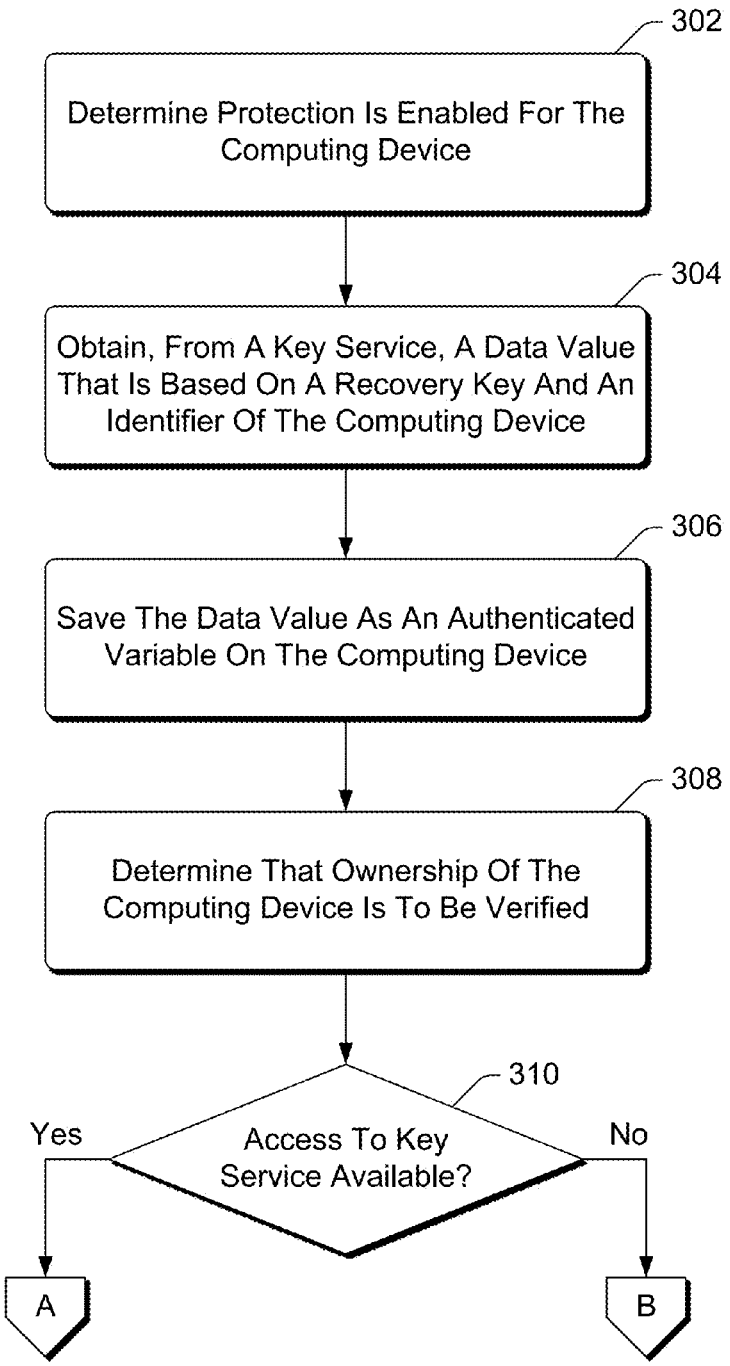
FIGS. 3A and 3B are a flowchart illustrating an example process for implementing device theft protection associating a device identifier and a user identifier in accordance with one or more embodiments.
Figure 3B:
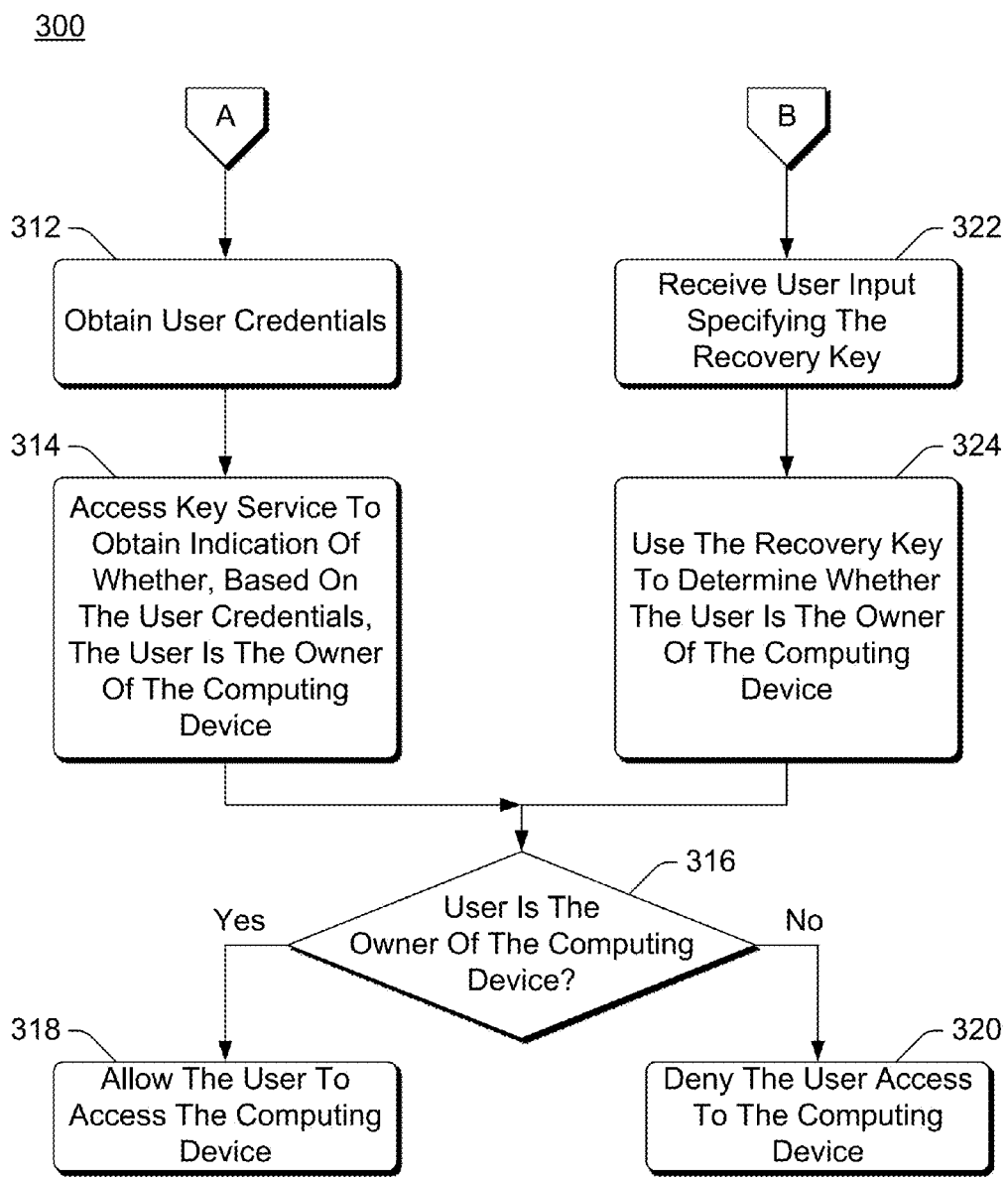

FIGS. 3A and 3B are a flowchart illustrating an example process 300 for implementing device theft protection associating a device identifier and a user identifier in accordance with one or more embodiments. Process 300 is carried out by a computing device, such as computing device 102 of FIG. 1, and can be implemented in software, firmware, hardware, or combinations thereof. Process 300 is shown as a set of acts and is not limited to the order shown for performing the operations of the various acts. Process 300 is an example process for implementing device theft protection associating a device identifier and a user identifier; additional discussions of implementing device theft protection associating a device identifier and a user identifier are included herein with reference to different figures.

In process 300, a determination is made as to whether protection for the computing device is enabled (act 302). The computing device referred to in process 300 is the computing device implementing the process 300. Protection for the computing device can be enabled at different times. In one or more embodiments, a new computing device (e.g., a newly purchased or out-of-the-box computing device) is by default determined to have protection enabled when the computing device is first booted, although the user can optionally opt out of having protection enabled. Additionally or alternatively, protection for a computing device can be determined to be enabled at different times, such as in response to a user input to the computing device requesting that protection be enabled, a request from another service (e.g., the key service 106) that protection be enabled, and so forth.

In response to determining that protection is enabled for the computing device, a data value that is based on a recovery key for the computing device and an identifier of the computing device is obtained from a key service (act 304). The data value can be generated by the key service applying a cryptographic hash function to the recovery key and the computing device identifier as discussed above. The recovery key is generated by the key service, and the computing device identifier is provided by the computing device. The computing device identifier can take any of a variety of different forms that allow different computing devices to be distinguished from one another, such as a unique hardware identifier included in a hardware component of the computing device, a value generated by a combination of hardware or software identifiers on the device, and so forth.

Figure 4A:
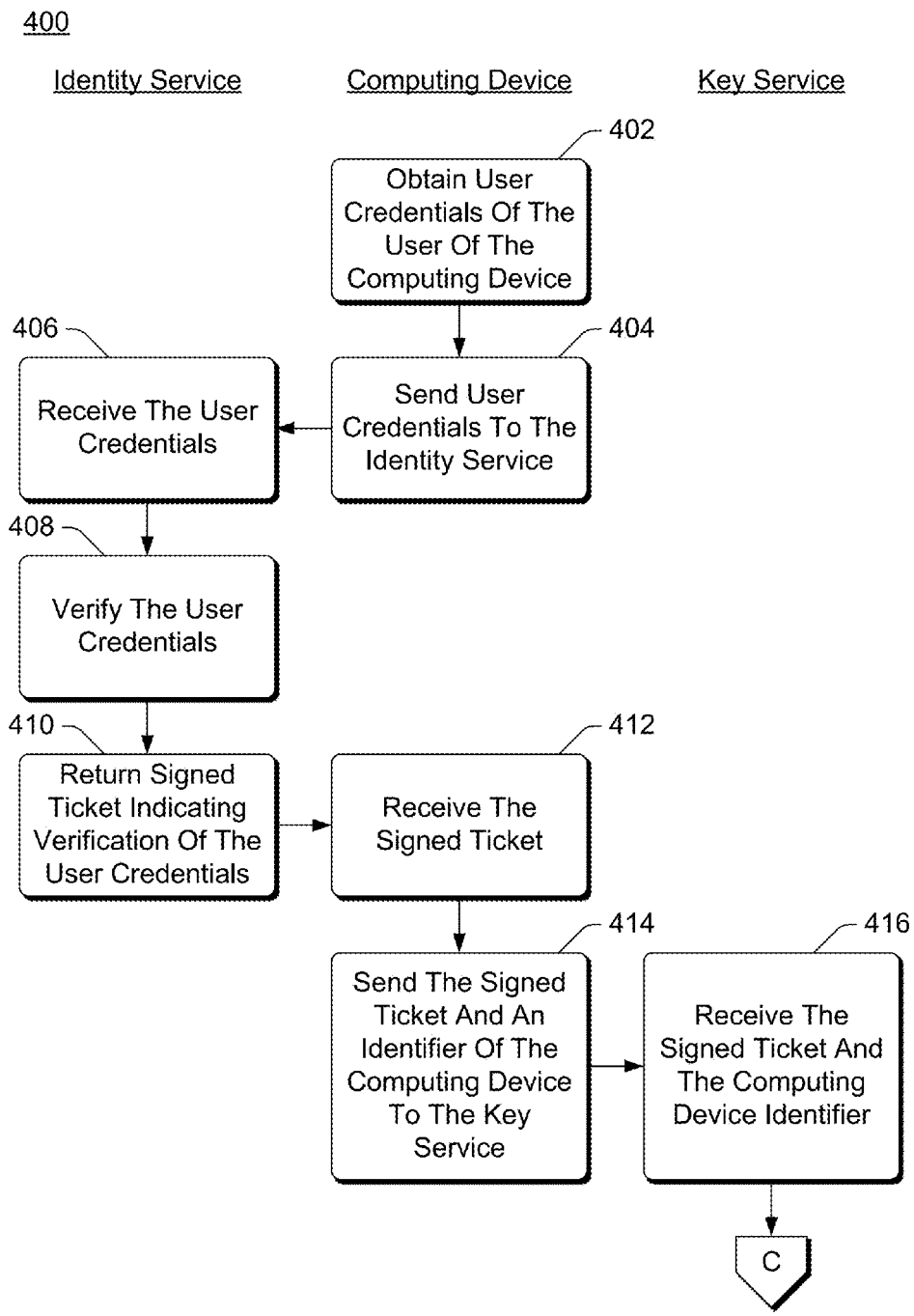
FIGS. 4A and 4B are a flowchart illustrating an example process implementing the obtaining of a data value that is based on a recovery key and an identifier of a computing device in accordance with one or more embodiments.
Figure 4B:
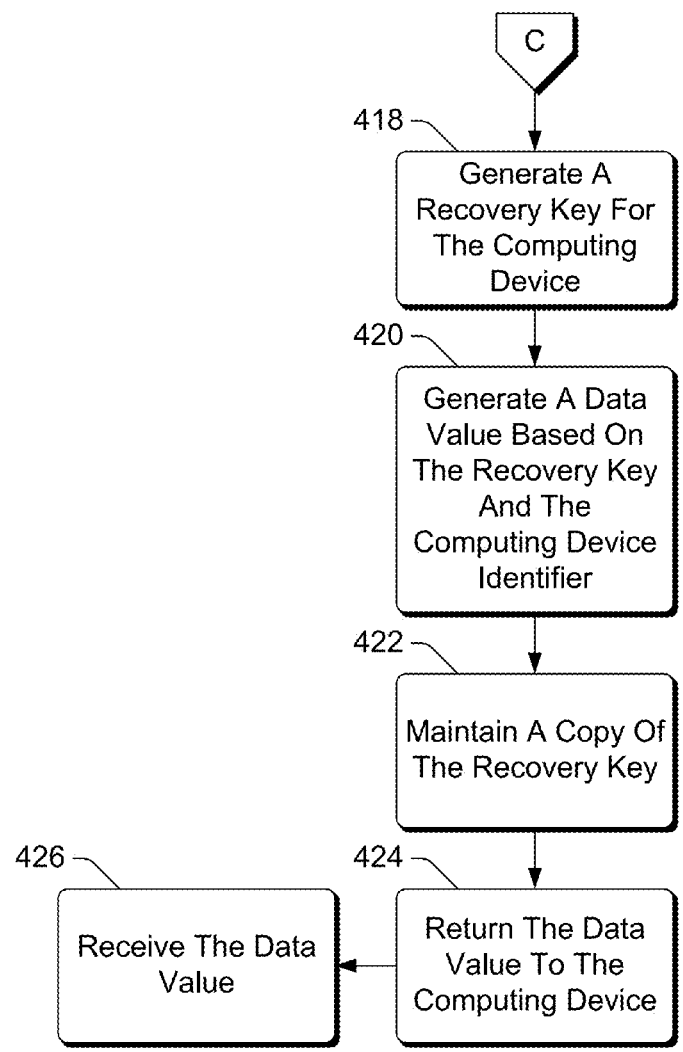

FIGS. 4A and 4B are a flowchart illustrating an example process 400 implementing the obtaining of a data value that is based on a recovery key and an identifier of a computing device in accordance with one or more embodiments. In one or more embodiments, process 400 implements act 304 of FIG. 3A. Process 400 can be implemented in software, firmware, hardware, or combinations thereof. Acts of process 400 illustrated on the left-hand side of FIG. 4 are carried out by an identity service, such as the identity service 104 of FIG. 1. Acts of process 400 illustrated on the right-hand side of FIG. 4 are carried out by a key service, such as the key service 106 of FIG. 1. Acts of process 400 illustrated in the middle of FIG. 4 are carried out by a computing device, such as the computing device 102 of FIG. 1 or FIG. 2. Process 400 is shown as a set of acts and is not limited to the order shown for performing the operations of the various acts. Process 400 is an example process for obtaining of a data value that is based on a recovery key and an identifier of a computing device; additional discussions of obtaining of a data value that is based on a recovery key and an identifier of a computing device are included herein with reference to different figures.

In process 400, user credentials of the user of the computing device are obtained (act 402). These user credentials can take various forms as discussed above, and can be provided by any of a variety of different user inputs as discussed above.

The user credentials are sent to the identity service (act 404) over a network, such as the network 108 of FIG. 1. The identity service receives the user credentials (act 406) and verifies the received user credentials (act 408). The user credentials can be verified in different manners, such as by comparing the user credentials to user credentials previously provided by the user (from the same computing device or a different computing device) and stored by the identity service and determining whether the received user credentials match (are the same as) the stored user credentials. Additionally or alternatively, the user credentials can be verified in other manners, such as by applying various rules or algorithms to the user credentials.

A ticket that is digitally signed by the identity service and that indicates the user credentials are verified is returned to the computing device (act 410). The ticket is a collection of data (e.g., a data packet or other data structure). It should be noted that process 400 assumes that the user credentials are verified by the identity service. If the user credentials are not verified by the identity service, then the ticket returned by the identity service to the computing device indicates that the user credentials are not verified.

The signed ticket is received by the computing device, which sends the signed ticket and an identifier of the computing device to the key service (act 414) over a network, such as the network 108 of FIG. 1. The key service receives the signed ticket and the computing device identifier (act 416) and generates a recovery key for the computing device (act 418). The recovery key can be generated in various different manners, such as using a random number generator or pseudo random number generator, by applying particular rules or algorithms based on the computing device identifier, and so forth.

A data value is generated based on the recovery key and the computing device identifier (act 420). In one or more embodiments, the data value is generated by combining (e.g., concatenating) the recovery key and the computing device identifier, and then applying a cryptographic hash function to the combined recovery key and computing device identifier.

The key service maintains a copy of the recovery key (act 422). The copy of the recovery key is stored by the key service, and an indication that the recovery key is associated with the computing device identifier of the computing device (e.g., as received from the computing device) and an identifier of the user (e.g., as indicated in the ticket signed by the identity service) is maintained. This association can be maintained in different manners, such as by using a list, record, table, or other data structure identifying the association.

The data value is returned to the computing device (act 424), which receives the data value from the key service (act 426).

It should be noted that process 400 assumes that the user credentials are verified by the identity service, and further that the digital signature on the ticket is verified by the key service. If the user credentials are not verified by the identity service and/or the digital signature on the ticket is not verified by the key service, then the key service does not generate a recovery key in act 418 and does not return a data value to the computing device in act 424.

Returning to FIG. 3A, the obtained data value is saved to the authenticated variable storage system on the computing device as an authenticated variable (act 306). The data value is saved only if the data value is authenticated (e.g., is digitally signed by a trusted entity) as discussed above. This data value can be used to prove that a user of the computing device is the owner of the computing device, as discussed in more detail below.

In one or more embodiments, the data value is referred to as a protection state variable. In situations in which the authenticated variable storage system is implemented using the UEFI Specification, the protection state variable is stored as an authenticated UEFI variable having attributes indicating that the variable is to be stored in nonvolatile memory, is to be accessible during booting of the computing device, is to be accessible during runtime of the computing device, and with a timestamp indicating the date and time that the variable is stored.

At some point in time, a determination is made that ownership of the computing device is to be verified (act 308). This determination is made, for example, by the theft protection system 110 of the computing device 102. This determination can be made at various times or in response to various different events that the developer or designer of the theft protection system 110 has determined it is desirable to verify that the user of the computing device is indeed the owner of the computing device. Such times or events can be, for example, at the time that the user desires to make his or her computing device an unprotected computing device, at the time that a new version of an operating system is installed on the computing device, at a time when a notification is received from a remote service (e.g., the key service 106) that the user's device is reported stolen or lost, at the time a user is attempting to flash a new image on the computing device, and so forth.

Process 300 proceeds based on whether access to the key service is available to the computing device (act 310). Access to the key service may not be available to the computing device for various reasons, such as the computing device not being in a location that has network access, network functionality of the computing device being deactivated, and so forth.

If access to the key service is available to the computing device, then user credentials are obtained at the computing device (act 312). The key service is accessed to obtain an indication of whether, based on the user credentials, the user is the owner of the computing device (act 314). In act 314, the user credentials are provided to the identity service, which returns a digitally signed ticket indicating that the user credentials are verified, and the computing device provides the digitally signed ticket to the key service as discussed above with reference to process 300. The key service determines whether it has a record of a valid recovery key for the user identifier and the computing device identifier provided by the computing device. If the key service has a record of a valid recovery key for the user identifier and the computing device identifier provided by the computing device, then the key service returns an indication that the user is the owner of the computing device. If the key service does not have a record of a valid recovery key for the user identifier and the computing device identifier provided by the computing device, then the key service returns an indication that the user is not the owner of the computing device.

A recovery key, when generated by the key service (e.g., in act 418 of FIG. 4B), is initially a valid recovery key. The recovery key can become invalid in response to a variety of different events. One such event is a user request (e.g., from the computing device 102 of FIG. 1 or the computing device 114 of FIG. 1) to change the computing device 102 to an unprotected state. Another such event is the key service revealing the recovery key to another device (e.g., the computing device 114 of FIG. 1). Alternatively, rather than maintaining a record that the recovery key is invalid, the key service can simply delete the recovery key so that the key service has no record of a recovery key for the user identifier and the computing device identifier provided by the computing device.

Process 300 proceeds based on whether the user is the owner of the computing device (at 316). If the key service indicates that the user is the owner of the computing device, then the user has been proven to be the owner of the computing device and is allowed to access the computing device (ace 318). However, if the key service indicates that the user is not the owner of the computing device, then the user has not been proven to be the owner of the computing device and the user is denied access to the computing device (ace 320).

Returning to act 310, if access to the key service is not available to the computing device, then a user input specifying the recovery key is received (act 322). The recovery key can be provided using any of a variety of different user inputs as discussed above. The recovery key is obtained by the user providing his or her user credentials to the identity service using a different computing device (e.g., the computing device 114 of FIG. 1), receiving a digitally signed ticket from the identity service indicating that the user credentials are verified, and providing the digitally signed ticket to the key service, which in turn reveals the recovery key to the user (e.g., sends the recovery key to the computing device 114 for display). The user can then input the recovery key to the computing device in act 322 (e.g., the recovery key can be a sequence of alphanumeric characters that are entered by the user via a keypad or touchscreen).

The recovery key is used to determine whether the user is the owner of the computing device (act 324). The recovery key is used to determine whether the user is the owner of the computing device by combining the recovery key with the computing device identifier and generating a data value, such as by applying a cryptographic hash function to the combination of the recovery key and the computing device identifier. The data value can be generated in act 324 in various manners, but is generated in the same manner as the data value is generated by the key service in act 420 of FIG. 4B. As the data values generated by the computing device and the key service are generated in the same manner, if the recovery key input by the user is the same as the recovery key that was generated by the key service, then the same data values will be generated. Accordingly, if the data value generated by the computing device is the same as the data value stored as the authenticated variable on the computing device in act 306, then the user is determined to be the owner of the computing device in act 324. However, if the data value generated by the computing device is not the same as the data value stored as the authenticated variable on the computing device in act 306, then the user is determined to not be the owner of the computing device in act 324.

Process 300 proceeds based on whether the user is the owner of the computing device (at 316). If the user is determined to be the owner of the computing device in act 324, then the user has been proven to be the owner of the computing device and is allowed to access the computing device (ace 318). However, if the user is determined to not be the owner of the computing device in act 324, then the user has not been proven to be the owner of the computing device and the user is denied access to the computing device (ace 320).

Returning to FIG. 2, in one or more embodiments the process of proving the user is the owner of the computing device by user input providing the recovery key also operates to change the state of the computing device from the protected state to the unprotected state. The recovery key provided by the user is stored in the authenticated variable storage system 206 as an unauthenticated variable (although can alternatively be stored as an authenticated variable). An unauthenticated variable, refers to a variable that can be overwritten without any approval of a service that verifies the user's credentials.

The recovery key stored in the authenticated variable storage system 206 can be used by the theft protection system 110 to verify that the computing device 102 is in an unprotected state. The recovery key stored in the authenticated variable storage system 206 can be used, along with the computing device identifier, to generate a data value (in the same manner as the data value is generated by the key service in act 420 of FIG. 4B), and compared to the data value stored in the authenticated variable storage system 206. If the generated data value and the data value stored in the authenticated variable storage system 206 are the same, then the theft protection system 110 knows that the computing device 102 is in the unprotected state. By maintaining the recovery key in the authenticated variable storage system 206, the computing device remains operational (e.g., is not blocked or "bricked"), although in an unprotected state.

In one or more embodiments, the recovery key stored in the authenticated variable storage system 206 is referred to as a recovery key variable. In situations in which the authenticated variable storage system is implemented using the UEFI Specification, the recovery key variable is stored as an unauthenticated UEFI variable having attributes indicating that the variable is to be stored in nonvolatile memory, is to be accessible during booting of the computing device, and is to be accessible during runtime of the computing device.

It should be noted that once the computing device 102 is in an unprotected state, the recovery key is no longer used to verify that the computing device 102 is in a protected state. However, if the computing device 102 were to be protected again, a new recovery key is generated and a new data value is stored on the computing device 102 as discussed above in process 400 of FIGS. 4A and 4B.

In one or more embodiments, the computing device 102 also protects against operating system rollback. Situations can arise in which some versions of an operating system include the theft protection system 110 discussed herein, whereas previous versions of the operating system do not include the theft protection system 110. In such situations, the computing device 102 operates to prevent rollback of the operating system of the computing device 102 to a previous version of the operating system that does not support the theft protection discussed herein (e.g., that does not include the theft protection system 110).

In one or more embodiments, the authenticated variable storage system 206 includes a list of identifiers of versions of the operating system that are not to be run on the computing device 102 (e.g., because they do not include the theft protection system 110). Such a list is also referred to as a blacklist, and the identifiers of versions of the operating system can take various forms (e.g., identifiers assigned by the operating system manufacturer, values generated by applying hash functions to components or modules of the operating system, and so forth). If an attempt is made to boot the computing device 102 with an operating system that is not to be run on the computing device 102, or an attempt is otherwise made to run such an operating system on the computing device 102, the authenticated variable storage system 206 prevents the operating system from booting or otherwise running on the computing device 102. Thus, any attempt by a thief to install an earlier version of an operating system on the computing device 102 in order to avoid needing to enter user credentials (which he or she will not know) will be unsuccessful. In situations in which the authenticated variable storage system 206 is implemented using the UEFI Specification, the list of identifiers of versions of the operating system that are not to be run on the computing device 102 is stored in a dbx database of the authenticated variable storage system 206.

Returning to FIG. 1, it should also be noted that situations can arise in which the key service 106 and the theft protection system 110 have two different views of whether the computing device 102 is in the protected state or the unprotected state. For example, a user of the computing device 114 may access the key service 106 and change the state of the computing device 102 to the unprotected state. Until the computing device 102 is able to communicate with the key service 106, the key service 106 believes that the computing device 102 is in the unprotected state but the computing device 102 believes the computing device 102 is in the protected state. This situation is resolved by the theft protection system 110 obtaining an indication from the key service 106 that the computing device 102 is now in the unprotected state. Such an indication can be received in a push manner (e.g., the key service 106 initiating sending a message or other indication to the theft protection system 110) or in a pull manner (e.g., the theft protection system 110 checking, at regular or irregular intervals, with the key service 106).

It should further be noted that situations can arise in which trusted mobile operators or manufacturers desire to have a computing device changed from the unprotected state to the protected state. For example, a user may purchase a computing device, put the computing device in a protected state, and then return the computing device for a refund or to exchange it or another device. In such situations, the trusted mobile operators or manufacturers are able to prove their identity and their right to ownership of the computing device to an administrator of the key service 106 or to an authorization program running on the key service 106. Once the trusted mobile operators or manufacturers prove their identity and right to ownership of the computing device, the key service 106 provides the recovery key to the mobile operator or manufacturer, allowing the mobile operator or manufacturer to change the computing device to an unprotected state. However, upon reselling or otherwise providing the computing device to a new user, the new user can have the computing device changed to the protected state, with a new recovery key being generated and a new data value (based on the new recovery key and the computing device identifier) being stored on the computing device.

It should be noted that the techniques discussed herein allow a computing device to be put in the protected state at various times, and to switch between being in the protected state and the unprotected state. The techniques discussed herein do not rely on any particular action being taken by the manufacturer or device designer to generate the protected state of the computing device at the time the computing device is manufactured.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
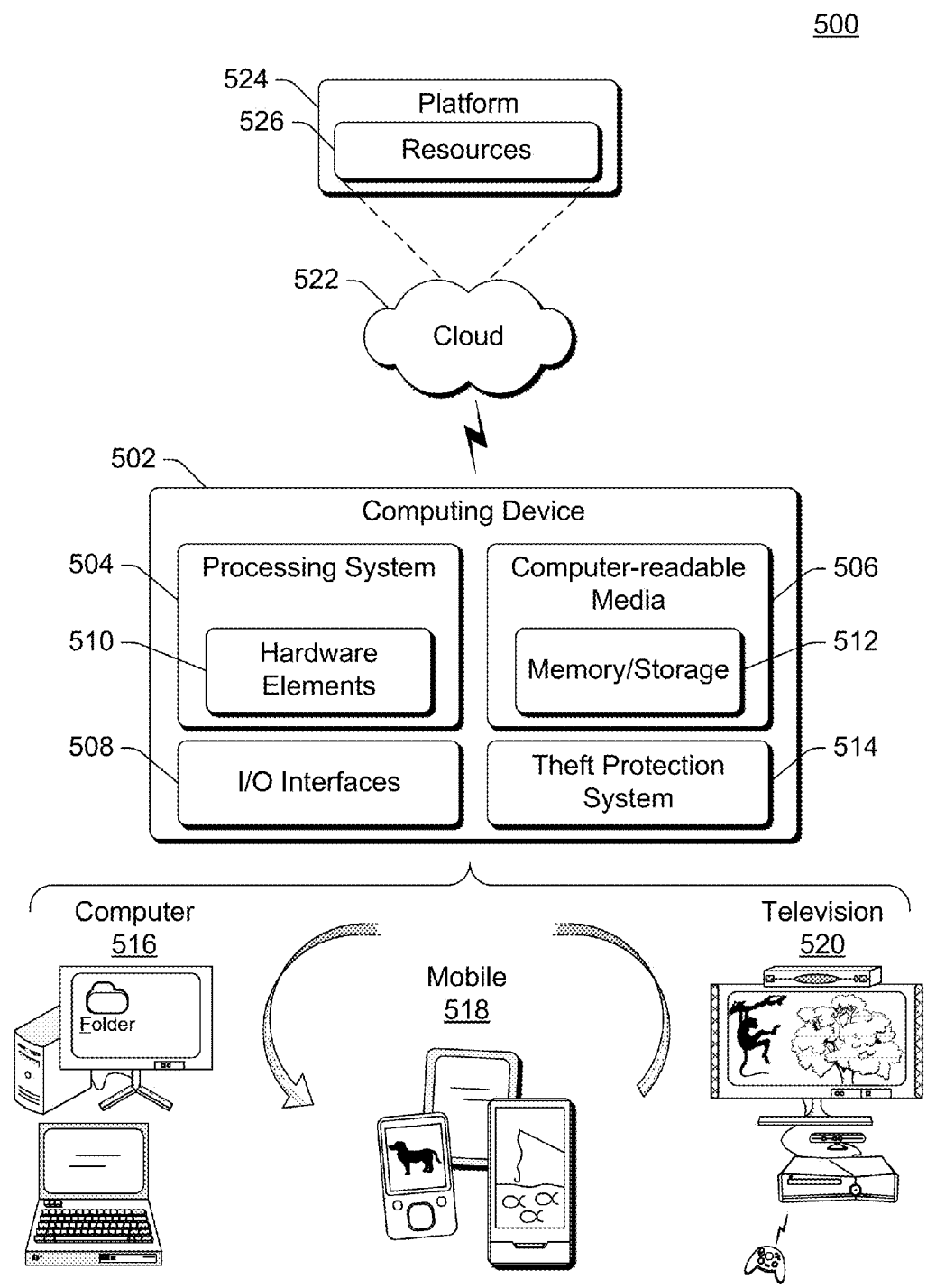
FIG. 5 illustrates an example system that includes an example computing device that is representative of one or more systems and/or devices that may implement the various techniques described herein.

FIG. 5 illustrates an example system generally at 500 that includes an example computing device 502 that is representative of one or more systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O Interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

The one or more input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

The computing device 502 also includes a theft protection system 514. The theft protection system 514 provides various theft protection functionality as discussed above. The theft protection system 514 can implement, for example, the theft protection system 110 of FIGS. 1 and 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 502 may assume a variety of different configurations, such as for computer 516, mobile 518, and television 520 uses. Each of these configurations includes devices that may have generally different constructs and capabilities, and thus the computing device 502 may be configured according to one or more of the different device classes. For instance, the computing device 502 may be implemented as the computer 516 class of a device that includes a personal computer, desktop computer, a multi-screen computer, laptop computer, netbook, and so on.

The computing device 502 may also be implemented as the mobile 518 class of device that includes mobile devices, such as a mobile phone, portable music player, portable gaming device, a tablet computer, a multi-screen computer, and so on. The computing device 502 may also be implemented as the television 520 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This functionality may also be implemented all or in part through use of a distributed system, such as over a "cloud" 522 via a platform 524 as described below.

The cloud 522 includes and/or is representative of a platform 524 for resources 526. The platform 524 abstracts underlying functionality of hardware (e.g., servers) and software resources of the cloud 522. The resources 526 may include applications and/or data that can be utilized while computer processing is executed on servers that are remote from the computing device 502. Resources 526 can also include services provided over the Internet and/or through a subscriber network, such as a cellular or Wi-Fi network.

The platform 524 may abstract resources and functions to connect the computing device 502 with other computing devices. The platform 524 may also serve to abstract scaling of resources to provide a corresponding level of scale to encountered demand for the resources 526 that are implemented via the platform 524. Accordingly, in an interconnected device embodiment, implementation of functionality described herein may be distributed throughout the system 500. For example, the functionality may be implemented in part on the computing device 502 as well as via the platform 524 that abstracts the functionality of the cloud 522.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a computing device, the method comprising: determining that theft protection is to be enabled on the computing device; sending, to an identity service over a network, user credentials of a user of the computing device; receiving, from the identity service, a ticket indicating that the user credentials have been verified by the identity service; sending, to a key service over the network, the ticket; receiving, from the key service, a data value having been generated by the key service based on a recovery key for the computing device as well as a device identifier that identifies the computing device; and saving the data value as an authenticated variable on the computing device, improving security of the computing device by associating the computing device with the user.

Alternatively or in addition to any of the above described methods, any one or combination of: the recovery key having been generated by the key service, and the data value having been generated by applying a cryptographic hash function to a combination of the recovery key and the device identifier; the method further comprising preventing rollback of an operating system of the computing device to a previous version of the operating system that does not support the theft protection; the preventing including checking whether an operating system version identifier list included in an authenticated variable storage system of the computing device includes an identifier of an operating system being booted on the computing device, and preventing the operating system from booting on the computing device if the operating system version identifier list includes the identifier of the operating system being booted on the computing device; the method further comprising determining that ownership of the computing device is to be verified, obtaining, in response to access to the key service over the network being available, an indication from the key service whether the user is the owner of the computing device, the indication being based on user credentials input to the computing device, using, in response to access to the key service over the network not being available, the recovery key received as user input to determine whether the user is the owner of the computing device, allowing the user to access the computing device in response to the user being determined to be the owner of the computing device, and denying the user access to the computing device in response to the user being determined to not be the owner of the computing device; the method further comprising receiving user input that is the recovery key of the computing device, generating an additional data value based on the user input as well as the device identifier that identifies the computing device, determining whether the data value and the additional data value are the same value, and changing the computing device to an unprotected state in response to the data value and the additional data value being the same value; the saving the data value as an authenticated variable comprising writing the data value to an authenticated variable storage system of the computing device, and the method further comprising writing the recovery key to the authenticated variable storage system as an unauthenticated variable; the saving the data value as an authenticated variable comprising writing the data value to an authenticated variable storage system of the computing device.

A computing device comprising: one or more processors; and computer-readable storage medium having stored thereon multiple instructions that, responsive to execution by the one or more processors, cause the one or more processors to perform acts including: determining that ownership of the computing device is to be verified; obtaining, in response to access to a key service over a network being available, an indication from the key service whether the user is the owner of the computing device, the indication being based on user credentials input to the computing device; using, in response to access to the key service over the network not being available, a recovery key received as user input to determine whether the user is the owner of the computing device; allowing the user to access the computing device in response to the user being determined to be the owner of the computing device; and denying the user access to the computing device in response to the user being determined to not be the owner of the computing device, security of the computing device being improved by associating the computing device with the user.

Alternatively or in addition to any of the above described computing devices, any one or combination of: the acts further comprising, in response to access to the key service over the network not being available, generating a first data value based on the recovery key as well as a device identifier that identifies the computing device, determining whether the first data value and a second data value stored in an authenticated variable storage system of the computing device are the same value, and changing the computing device to an unprotected state in response to the first data value and the second data value being the same value; the acts further comprising writing the recovery key to the authenticated variable storage system as an unauthenticated variable.

A computing device comprising: one or more processors; and computer-readable storage medium having stored thereon multiple instructions that, responsive to execution by the one or more processors, cause the one or more processors to perform acts including: determining that theft protection is to be enabled on the computing device; sending, to an identity service over a network, user credentials of a user of the computing device; receiving, from the identity service, a data structure indicating that the user credentials have been verified by the identity service; sending, to a key service over the network, the data structure; receiving, from the key service, a first data value having been generated by the key service based on a recovery key for the computing device as well as a device identifier that identifies the computing device; and saving the first data value as an authenticated variable on the computing device, security of the computing device being improved by associating the computing device with the user.

Alternatively or in addition to any of the above described computing devices, any one or combination of: the first data value having been generated by applying a cryptographic hash function to a combination of the recovery key and the device identifier; the acts further comprising preventing rollback of an operating system of the computing device to a previous version of the operating system that does not support the theft protection; the preventing including checking whether an operating system version identifier list included in an authenticated variable storage system of the computing device includes an identifier of an operating system being booted on the computing device, and preventing the operating system from booting on the computing device if the operating system version identifier list includes the identifier of the operating system being booted on the computing device; the acts further comprising determining that ownership of the computing device is to be verified, obtaining, in response to access to the key service over the network being available, an indication from the key service whether the user is the owner of the computing device, the indication being based on user credentials input to the computing device, using, in response to access to the key service over the network not being available, the recovery key received as user input to determine whether the user is the owner of the computing device, allowing the user to access the computing device in response to the user being determined to be the owner of the computing device, and denying the user access to the computing device in response to the user being determined to not be the owner of the computing device; the acts further comprising receiving user input that is the recovery key of the computing device, generating a second data value based on the user input as well as the device identifier that identifies the computing device, determining whether the first data value and the second data value are the same value, and changing the computing device to an unprotected state in response to the first data value and the second data value being the same value; the saving the data value as an authenticated variable comprising writing the data value to an authenticated variable storage system of the computing device, and the acts further comprising writing the recovery key to the authenticated variable storage system as an unauthenticated variable; the saving the data value as an authenticated variable comprising writing the data value to an authenticated variable storage system of the computing device; the authenticated variable storage system implementing the unified extensible firmware interface specification.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
    determining that theft protection is to be enabled on the computing device;
    sending, to an identity service over a network, user credentials of a user of the computing device;
    receiving, from the identity service, a ticket indicating that the user credentials have been verified by the identity service;
    sending, to a key service over the network, the ticket;
    receiving, from the key service, a data value having been generated by the key service based on both a recovery key for the computing device and a device identifier that identifies the computing device;
    saving the data value as an authenticated variable on the computing device by writing the data value to an authenticated variable storage system of the computing device;
    receiving user input that is the recovery key of the computing device;
    generating an additional data value based on the user input as well as the device identifier that identifies the computing device;
    determining whether the data value and the additional data value are the same value;
    changing the computing device to an unprotected state in response to the data value and the additional data value being the same value;
    allowing the user to access the computing device in the unprotected state in response to the data value and the additional data value being the same value; and
    denying the user access to the computing device in response to the data value and the additional data value not being the same value.

2. The method as recited in claim 1, the recovery key having been generated by the key service.

3. The method as recited in claim 1, further comprising preventing rollback of an operating system of the computing device to a previous version of the operating system that does not support the theft protection.

4. The method as recited in claim 3, the preventing including:
    checking whether an operating system version identifier list included in the authenticated variable storage system of the computing device includes an identifier of an operating system being booted on the computing device; and
    preventing the operating system from booting on the computing device if the operating system version identifier list includes the identifier of the operating system being booted on the computing device.

5. The method as recited in claim 1, further comprising:
    determining that ownership of the computing device is to be verified;
    obtaining, in response to access to the key service over the network being available, an indication from the key service whether the user is the owner of the computing device, the indication being based on user credentials input to the computing device;
    allowing the user to access the computing device in response to the user being determined to be the owner of the computing device; and
    denying the user access to the computing device in response to the user being determined to not be the owner of the computing device.

6. The method as recited in claim 1, the authenticated variable storage system implementing the unified extensible firmware interface specification.

7. The method as recited in claim 1, the data value having been generated based on a concatenation of the recovery key and the device identifier.

8. A computing device comprising:
    one or more hardware processors; and
    one or more computer-readable storage media having stored thereon multiple instructions that, responsive to execution by the one or more processors, cause the one or more processors to perform acts including:
    determining that theft protection is to be enabled on the computing device;
    sending, to an identity service over a network, user credentials of a user of the computing device;
    receiving, from the identity service, a data structure indicating that the user credentials have been verified by the identity service;
    sending, to a key service over the network, the data structure;
    receiving, from the key service, a first data value having been generated by the key service based on both a recovery key for the computing device and a device identifier that identifies the computing device;

saving the first data value as an authenticated variable on the computing device by writing the first data value to an authenticated variable storage system of the computing device;

receiving user input that is the recovery key of the computing device;

generating a second data value based on the user input as well as the device identifier that identifies the computing device;

determining whether the first data value and the second data value are the same value;

changing the computing device to an unprotected state in response to the first data value and the second data value being the same value;

allowing the user to access the computing device in the unprotected state in response to the first data value and the second data value being the same value; and denying the user access to the computing device in response to the first data value and the second data value not being the same value.

9. The computing device as recited in claim 8, the recovery key having been generated by the key service.

10. The computing device as recited in claim 8, the acts further comprising preventing rollback of an operating system of the computing device to a previous version of the operating system that does not support the theft protection.

11. The computing device as recited in claim 10, the preventing including:

checking whether an operating system version identifier list included in the authenticated variable storage system of the computing device includes an identifier of an operating system being booted on the computing device; and preventing the operating system from booting on the computing device if the operating system version identifier list includes the identifier of the operating system being booted on the computing device.

12. The computing device as recited in claim 8, the acts further comprising:

determining that ownership of the computing device is to be verified;

obtaining, in response to access to the key service over the network being available, an indication from the key service whether the user is the owner of the computing device, the indication being based on user credentials input to the computing device;

allowing the user to access the computing device in response to the user being determined to be the owner of the computing device; and denying the user access to the computing device in response to the user being determined to not be the owner of the computing device.

13. The computing device as recited in claim 8, the authenticated variable storage system implementing the unified extensible firmware interface specification.

14. A system with a computing device comprising:

an authenticated variable storage device; and a theft protection system, implemented at least in part by a processor, configured to:

determine that theft protection is to be enabled on the computing device;

send, to an identity service over a network, user credentials of a user of the computing device;

receive, from the identity service, a ticket indicating that the user credentials have been verified by the identity service;

send, to a key service over the network, the ticket;

receive, from the key service, a data value having been generated by the key service based on both a recovery key for the computing device and a device identifier that identifies the computing device;

save the data value as an authenticated variable on the computing device by writing the data value to the authenticated variable storage system;

receive user input that is the recovery key of the computing device;

generate an additional data value based on the user input as well as the computing device identifier that identifies the device;

determine whether the data value and the additional data value are the same value;

change the computing device to an unprotected state in response to the data value and the additional data value being the same value;

allow the user to access the computing device in the unprotected state in response to the data value and the additional data value being the same value; and deny the user access to the computing device in response to the data value and the additional data value not being the same value.

15. The system as recited in claim 14, wherein the recovery key having been generated by the key service.

16. The system as recited in claim 14, wherein the theft protection system is further configured to prevent rollback of an operating system of the computing device to a previous version of the operating system that does not support the theft protection.

17. The system as recited in claim 16, wherein to prevent rollback includes to:

check whether an operating system version identifier list of the computing device includes an identifier of an operating system being booted on the computing device; and prevent the operating system from booting on the computing device if the operating system version identifier list includes the identifier of the operating system being booted on the computing device.

18. The system as recited in claim 17, wherein the operating system version identifier list being included in the authenticated variable storage device.

19. The system as recited in claim 14, wherein the theft protection system is further configured to:

determine that ownership of the computing device is to be verified;

obtain, in response to access to the key service over the network being available, an indication from the key service whether the user is the owner of the computing device, the indication being based on user credentials input to the computing device;

allow the user to access the computing device in response to the user being determined to be the owner of the computing device; and deny the user access to the computing device in response to the user being determined to not be the owner of the computing device.

20. The system as recited in claim 14, wherein the authenticated variable storage device implementing the unified extensible firmware interface specification.

* * * * *